Figure 1:
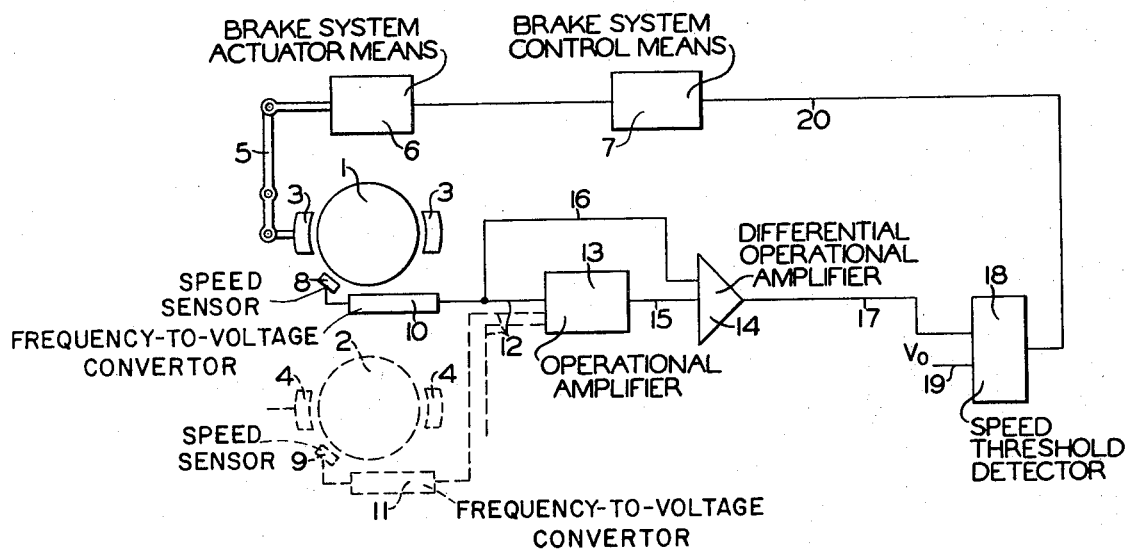

United States Patent [19]
Adde

[11] 3,819,004
[45] June 25, 1974

[54] METHOD AND APPARATUS FOR PREVENTING WHEEL SLIP

[75] Inventor: Joseph Adde, Montfermeil, France

[73] Assignee: Compagnie Des Freins et Signaux Westinghouse, Freinville-Sevran, France

[22] Filed: June 8, 1972

[21] Appl. No.: 260,971

[30] Foreign Application Priority Data
June 11, 1971  France .................. 71.21382

[52] U.S. Cl. ............ 180/82 R, 192/3 R, 303/20, 303/21 BE, 303/21 EB
[51] Int. Cl. ............ B60k 27/02, B60t 8/08
[58] Field of Search ...... 188/181; 235/150.2, 183; 303/20, 21; 317/5; 324/160–162; 340/52 B, 262–263; 180/82; 192/3 R

[56] References Cited
UNITED STATES PATENTS

| | | | |
|---|---|---|---|
| 3,339,061 | 8/1967 | Auer, Jr. .................. | 235/183 X |
| 3,342,984 | 9/1967 | Gray et al. ............... | 235/183 X |
| 3,482,887 | 12/1969 | Sheppard ................. | 303/21 BE |
| 3,511,542 | 5/1970 | Fielek, Jr. ................ | 303/21 EB |
| 3,545,817 | 12/1970 | Yarber .................... | 303/20 X |
| 3,574,415 | 4/1971 | Stamm .................... | 303/21 EB |
| 3,582,152 | 6/1971 | Burckhardt et al. ...... | 303/21 EB |
| 3,604,760 | 9/1971 | Atkins .................... | 303/20 UX |
| 3,614,172 | 10/1971 | Riordan .................. | 303/20 X |
| 3,621,222 | 11/1971 | Minami ................... | 235/183 X |

Primary Examiner—Milton Buchler
Assistant Examiner—Stephen G. Kunin
Attorney, Agent, or Firm—R. W. McIntire, Jr.

[57] ABSTRACT

The present invention concerns a method for preventing the skidding and slipping of the wheels of a single vehicle, or a train of coupled vehicles, and electronic apparatus for the application of this method. The present invention applies especially, but not exclusively, to the braking systems of trains and automobiles, the control of electrical valves for the admission and exhaust of fluids under pressure which activate the braking devices of a single vehicle or a train of coupled vehicles, this control being carried out as a function of the speed of the wheels.

1 Claim, 2 Drawing Figures

PATENTED JUN 25 1974  3,819,004

METHOD AND APPARATUS FOR PREVENTING WHEEL SLIP

BACKGROUND OF THE INVENTION

Skidding of a wheel, as used herein, is understood to be the gradual locking of the wheel which takes place when, in order to slow down the vehicle, a braking couple higher than the sum of the deceleration couple of the moment of inertia applied to the wheel and the adherence couple available at the contact between wheel and rolling surface is applied to the vehicle. The adherence couple depends on the load of the vehicle, the speed of the vehicle and the instantaneous adherence of the wheel to the rolling track.

Slipping of the wheel, as used herein, is understood when the vehicle wheel is subjected to a propulsion couple higher than the sum of the couples of instantaneous adhesion and the acceleration couple of the moment of inertia applied to the wheel. A wheel is considered to be slipping when its angular or peripheral speed is higher than the linear speed of the vehicle carried by the wheel. The peripheral speed is taken at the level of the normal rolling radius of the wheel because during the rolling of a pneumatic wheel, a slight skidding or slipping might occur at the contact zone between wheel and rolling surface, whereas adherence under normal running conditions would be increased.

To avoid skidding, one known method is to provide the wheel with a sensor generating an electrical signal whose frequency corresponds to the rotation rate, converting this frequency into voltage, relating such voltage to time in order to obtain a representative signal for any instance of the deceleration of the wheel, comparing this deceleration-indicating voltage to a reference voltage representing a basic deceleration, in order to provide a discrepancy signal for reducing the intensity of braking which is liable to induce skidding.

However, this method presents a serious shortcoming in that it is ineffective in case of gradual slipping or skidding occurring at such a low rate as to produce, respectively, an acceleration or a deceleration less than the detection threshold range of the antislipping or antiskidding devices. Thus, the wheel is subjected to increasing skidding which affects the stability of the vehicle as soon as it surpasses the maximal value of the adherence of the wheel to the running surface. It must be recalled that skidding is the ratio of the difference between the linear velocity of the vehicle and the angular or peripheral velocity of the wheel, at the speed of the vehicle mentioned.

Starting with the skidding corresponding to the maximum adherence, there is always the risk of a gradual increase of skidding which may last until the wheel stops completely. In such a case, in addition to the instability of the vehicle, possible deterioration of the wheel surface may also occur. During a slipping situation, the running surface is susceptible to deterioration.

Another system intended for use in a single vehicle with two axles, uses speed sensors at each wheel in order to generate a frequency in direct proportion to the rotation rate of the wheel, to convert this frequency into a voltage and to compare the representative voltages of the same axle in order to produce, as an example, a first voltage indicating the average speed of the two wheels on the forward axle and a second voltage indicating the lower of the two speeds of the wheels on the rear axle and to activate an antislipping electronic circuit when the second voltage is, to a certain predetermined magnitude or degree, lower than the first voltage.

The known device while allowing the detection of gradual slipping and skidding of a wheel, presents the drawback of either prematurely releasing the braking and propulsion action during high speed slipping or skidding action when the inertia of the wheels leads to long periods of slipping and there is, in fact, no risk of damaging the wheel surface, or to release the braking action too late during low speed slipping or skidding because the threshold value of the speed deviation is constant.

SUMMARY OF THE INVENTION

The purpose of the present invention is to improve on these drawbacks and to provide apparatus capable of providing a method for preventing the slipping and skidding of the wheels of a vehicle or a train of vehicles on a rolling track, by constantly monitoring and converting the actual rotation speed of each wheel or group of wheels into an analog voltage signal to produce a representative speed signal for each of the rates of rotation of the respective wheels, summing up the respective representative speed signals of at least two wheels and producing an average speed signal as a function of the arithmetic mean of said respective representative speed signals, comparing the average speed signal with the representative speed signal of one wheel to produce a differential signal, comparing said differential signal with a reference signal comprising the representative speed signal of one wheel or said average speed signal, and producing a command signal effective for causing operation of the braking or traction devices of at least one wheel or a group of wheels, said command signal resulting from the difference between the deviation of said differential signal with respect to the representative speed signal of the said one wheel or group of wheels subjected to this comparison, in one instance, and with respect to a predetermined threshold, in another instance. It is characteristic of this method that the predetermined threshold depends on the rotation rate signal of at least one wheel or group of wheels.

Accordingly, in the event of a possible slipping situation, even when the wheel or group of wheels are not experiencing a high rate of acceleration or deceleration, but rather a gradual change in rate of rotation, the command signal is in a position to reduce or nullify temporarily the braking or propulsion couple applied to the wheel or group of wheels considered and which might cause slipping or skidding, at an activation rate which varies according to the speed monitored for at least one wheel, in order to adjust to the variations of the adherence conditions. Thus, during the braking of a train, if the brake shoe-wheel friction coefficient becomes higher than the wheel-rail friction coefficient, the predetermined threshold becomes lower at low speed than at average speed. Also, due to the decrease of the wheel-rail friction coefficient, the predetermined high speed threshold also becomes smaller than at average speed. When applying brakes to an automobile, where the tire-road coefficient decreases with the increase of speed, the predetermined threshold becomes lower at high speed. Furthermore, during prolonged braking, as frequently happens for railroad trains, the predetermined threshold decreases gradually and automatically according to the gradual decrease of speed; obviously this represents a favorable effect. The variation of the threshold according to speed can be eventually combined into a variation of pressure in the cylinders of the brakes as a function of speed.

The predetermined threshold can advantageously depend on the differential speed signal, the latter depending on the value obtained subsequent to the summing up and averaging of several speed signals, in order to obtain a more accurate relationship between the threshold mentioned and the running speed of the vehicle or train of vheicles.

The predetermined threshold can be higher or lower than the difference between the differential speed signal and the representative speed signal of the wheel or group of wheels compared. The action of the command signal results in either total or partial reduction of braking or propulsion on at least one wheel or group of wheels which are the object of comparison. The restoration threshold can be different from the suppression or reduction threshold. It also can be equal to them. The use of a threshold for the restoration of braking or propulsion allows a better use of the adherence existing between the running surface and the wheel.

The command signal obtained from the difference between deviation and the predetermined threshold is digital in one instance and analog in the other.

When the command signal is digital, it can be amplified before being directed to the devices controlling the brakes or the motors. In the case of a braking system whose intensity is controlled by varying the pressure of a fluid, the command signal can also be transmitted to an electrical valve inserted on the circuit of the fluid in order to determine the momentary decrease or cessation, in a temporary manner for example, of the pressure exerted by the mechanical braking device of the slipping wheel. To obtain the total or partial recovery of the pressure, the command signal can be directed at the same electrical valve or at a different electrical valve. In a similar manner, in instances when propulsion is accomplished by means of electrical motors, the command signal by activating a contactor produces the shunt of the secondary circuit of the motor which moves the skidding wheel or group of wheels, or it can activate a safety switch or a field attenuator.

If the command signal is analog, it can be amplified and then directed at a continuous correction device inserted in an electrical or fluid circuit, such as a variable electrical valve in the case of a fluid braking or propulsion circuit.

According to another characteristic of the present invention, the average speed signal is the arithmetic mean of the several speed signals monitored. Thus, in the case of a railroad train, the first wheels of the train arriving over a rail section with a low adherence start spinning and the arithmetic mean is affected. In the case of an automobile, the predetermined threshold can be quite low in order to generate the command signal without delay despite the reduction of the arithmetic mean of the speed signals resulting from the spinning of a wheel.

Furthermore, the average speed signal also can be the arithmetic mean of the speed signals, affected by a coefficient which is different from one, such as to allow the adjustment for producing an instant emission of the command signal. The average speed signal can also be an integral function of the same arithmetic mean, affected by a coefficient which is different from one, in order to obtain an even better adjustment of the instant signal emission.

Another characteristic of the present invention is to produce concurrently with the command signal effecting total or partial reduction or total or partial resumption of braking or propulsion, another command signal for effecting total or partial reduction or total or partial resumption of braking or propulsion, respectively, by the derivation of the representative speed signal of one wheel or group of wheels and comparing said representative speed signal to an acceleration or deceleration reference signal. The first of the two command signals to appear acts on the braking or propulsion devices to produce total or partial reduction, or total or partial resumption of braking or propulsion.

According to this combination of speed signals and acceleration or deceleration signals, the invention allows the rapid activation of a command signal while, at the same time, guaranteeing for example in the case of slow spinning, the emission of a command signal although the predetermined deceleration threshold was not exceeded.

The present invention also concerns apparatus providing for the application of the method described, said apparatus comprising means for monitoring and converting the actual rotation rate of each wheel or group of wheels into respective representative speed signals of the rotation rates monitored, means connected to the various monitoring and conversion means for summing up and producing an average speed signal as a function of the arithmetic mean of the representative speed signals, comparator means connected to the summing up means and capable of comparing the representative speed signal produced by one wheel or a group of wheels with said average speed signal and producing a differential speed signal dependent on the value resulting from the summing up means, and means for the detection of the speed thresholds passed between the comparator means and command means for producing a command signal controlling the braking or propulsion action on at least one wheel or group of wheels for which the comparison was made. The threshold detection means sends a command signal to the brake and propulsion control devices when the deviation between the differential speed signal and the representative speed signal of the wheel being compared is other than a certain threshold, and is characterized by the fact that the inlet to the detection means is connected to the monitoring and conversion means of at least one wheel or group of wheels of the vehicle or train of vehicles.

The inlet of the means for the detection of the speed threshold is connected to the summing up means in such a manner as to obtain a predetermined threshold depending on the differential speed signal and, in particular, characterized by the arithmetic mean of the representative speed signals. Furthermore, the summing up means can be integrators.

The recovery and conversion means (which can be connected to derivation means which, in turn, are connected to the means for the detection of the acceleration and deceleration threshold, which are connected to the devices controlling braking or propulsion) act in parallel with means for the detection of speed threshold, in order to obtain the working combination of speeds and accelerations.

In addition, the means for the detection of the acceleration and deceleration threshold can be connected to means for summing up the speed in order to produce reference acceleration or deceleration signals of the threshold detection means depending on the average speed of wheels provided with monitoring and conversion means.

The representative speed signals and the command signal are of mechanical, pneumatic or electrical nature. When its nature is electrical, the representative speed signal preferably passes through the usual means of forming and filtering.

Figure 2:
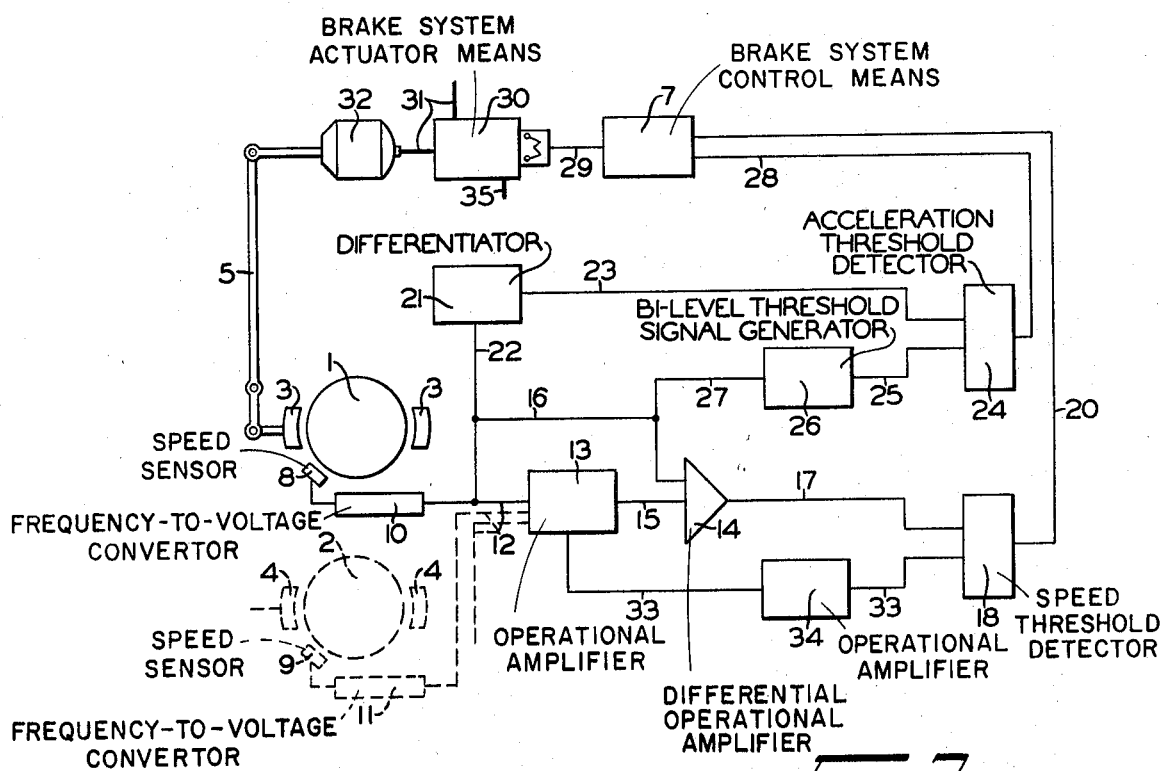

Other advantages and characteristics shall emerge from the indicative, but not restrictive, description presented below as well as from the attached drawing which shows the following features:

FIG. 1 is a schematic view of apparatus by which a method for preventing slipping and skidding of vehicle wheels is accomplished; and FIG. 2 is a schematic view of a variant of the invention shown in FIG. 1.

DESCRIPTION AND OPERATION

The respective apparatus shown in FIGS. 1 and 2 are intended for use with the control portions of fluid pressure operable brake systems of vehicles. The apparatus shown in FIG. 2 is specifically applied to a compressed air brake system of a railroad vehicle. These apparatus may also be employed on automotive vehicles for preventing slipping and skidding of the wheels thereof.

Shown in FIG. 1 are two wheels 1 and 2 of a vehicle (not shown) with conventionally arranged brake shoes 3 and 4, respectively, linkage 5 for operating the brake shoes, conventional brake actuating means 6 such as truck-mounted brake units of the well known type, and fluid pressure operable control means 7, the latter two components being represented symbolically since a detailed description thereof is not deemed essential to an understanding of the invention.

Each of the wheels 1 and 2 is provided with a generator or magnetic type speed sensor 8 and 9, respectively, delivering an electrical current at a frequency proportional to the rate of rotation of the respective wheel with which it is associated to respective frequency-to-voltage convertors 10 and 11. The convertors 10 and 11, in turn, yield representative speed analog signals $V_1$ and $V_2$, respectively, representative of the actual speeds of the respective associated wheels. All the representative speed signals $V_1$, $V_2$, etc. for the several wheels are received via respective conductors 12 by an operational amplifier 13, which sums up the several representative speed signals from the several convertors and produces an average speed signal $V_R$ as a function of the arithmetic mean of the several representative speed signals.

A differential operational amplifier 14 receives the average speed signal $V_R$ from amplifier 13 via a conductor 15, and also receives, via a conductor 16, the representative speed signal, such as $V_1$, for example, from one of the wheels to be protected against slipping or skidding. The outlet of differential operational amplifier 14 is connected via a conductor 17 to a speed threshold detector 18, which may be a Schmitt trigger, for example. The speed threshold detector 18 also receives, via a conductor 19, a reference speed signal $V_0$ which depends on the rotation rate of at least one wheel.

The speed threshold detector 18 is connected via a conductor 20 to the brake system control means 7.

In considering the operation of the apparatus shown in FIG. 1, the rotational speed of wheel 1, for example, is translated by sensor 8 into a current frequency which is converted by converter 10 into an analog voltage speed signal $V_1$. A similar process occurs for all wheels. Representative speed signals $V_1$, $V_2$, etc. are transmitted through respective conductors 12 to the operational amplifier 13 which formulates said speed signals into an average speed signal $V_R$ representing the arithmetic mean of the several speed signals of the wheels. Average speed signal $V_R$ as well as the representative speed signal $V_1$ from wheel 1 are transmitted to differential amplifier 14 which produces a differential speed signal $V_D = (V_R - V_1)$ and delivers said differential speed signal to speed threshold detector 18, which, as previously noted, also receives the reference speed signal $V_0$ representative of a predetermined threshold of the difference between the average speed signal $V_R$ and the actual speed signal $V_1$, of wheel 1.

During braking, if a skid occurs at wheel 1, the rapid decrease of the rotation of said wheel is reflected in speed signal $V_1$ and hence in the increasing difference between signals $V_R$ and $V_1$, which, in turn, results in a greater differential signal $V_D$ from differential amplifier 14. When signal $V_D$ at detector 18 surpasses signal $V_0$, said detector transmits a command signal or impulse to brake system control means 3 to effect a reduction or total release of the brakes at wheel 1.

When the rotation of wheel 1 resumes a normal rate, that is, free of skidding, the resulting signals $V_D$ and $V_0$ at detector 18 are restored to a compatible relation and braking at wheel 1 is restored.

Each of the other wheels, such as wheel 2, for example, are protected against skidding in similar manner to that described above in connection with wheel 1.

The apparatus shown in FIG. 2, in addition to the components shown in FIG. 1, which protects primarily against gradually occurring skids, also comprises a differentiator 21 connected to convertor 10 via conductors 12 and 16, and a branch conductor 22. Differentiator 21 is also connected, via a conductor 23, to an acceleration threshold detector 24, which, similar to detector 18, may be a Schmitt trigger. Detector 24 is also connected via a conductor 25 to a bi-level threshold reference signal generator 26 which, in turn, is connected via a branch conductor 27 to conductor 16 and, therefore, to convertor 10 of wheel 1, said detector 24 also being connected via a conductor 28 to the brake system control means 7.

Brake control means 7 is connected via a conductor 29 to an electrically operable valve device 30 interposed in a compressed air line 31 between a source of compressed air supply (not shown) and a brake cylinder device 32, said valve device being operable to either effect supply or release of compressed air to and from, respectively, said brake cylinder device.

The bi-level threshold signal generator 26, in response to the speed signal $V_1$ from convertor 10, produces signals of two magnitudes. If signal $V_1$ from wheel 1, for example, indicates a deceleration of said wheel, signal generator produces a threshold signal $T_0$ of 3 volts, for example, whereas if signal $V_1$ from wheel 1 indicates the wheel is accelerating, said signal generator produces a threshold signal $T_1$ of 6 volts, for example, thus providing a range between the two reference threshold signals $T_0$ and $T_1$.

Also, in the apparatus shown in FIG. 2, speed threshold detector 18 is connected via a conductor 33 to operational amplifier 13 for receiving therefrom the average speed signal $V_R$ as the reference threshold signal. An operational amplifier 34 may be interposed in conductor 33 if it is desired to further amplify signal $V_R$.

That portion of the apparatus shown in FIG. 2 comprising the components similar to those shown in FIG. 1, functions similarly to the apparatus shown in FIG. 1, in the manner above described, for correcting slipping or skidding of a wheel occurring at a gradual or relatively slow rate.

On the other hand, if deceleration of wheel 1, for example, occurs at a rapid rate and causes said wheel to skid, threshold signal generator 26 transmits threshold signal $T_0$ to detector 24, while, at the same time, differentiator 21 transmits a deceleration signal $D_0$ representing the deceleration rate of said wheel. If signal $D_0$ exceeds reference threshold signal $T_0$, above defined, detector 24 transmits a command signal to control means 7 which, in turn, effects operation of valve device 30 to either reduce or release compressed air from brake cylinder 32 via an exhaust vent 35 in said valve device.

Following the reduction or release of braking on wheel 1, said wheel commences to reaccelerate. If the rate of reacceleration is such as to cause slipping of wheel 1 and that an acceleration rate signal A, produced by the differentiator 20 and transmitted to threshold detector 24, exceeds the reference threshold signal $T_1$ transmitted to said threshold detector by the bi-level threshold signal generator 26, the threshold detector 24 transmits a command signal to the brake control means 7 to effect partial or total reapplication of the brakes on wheel 1. The other wheels such as wheel 2, for example, are protected against slipping and sliding in a manner similar to that described in connection with wheel 1.

Thus, with the arrangement as shown in FIG. 2, the vehicle wheels 1, 2, etc. are protected against gradually as well as rapidly occurring wheel slip or slide.

It is quite evident that the set up can be subjected to many modifications without exceeding the limits of the present invention.

Brake system actuator means 6, for example, can consist of a valve device (not shown) inserted in a hydraulic dircuit; in this case the action of the signal amplified by brake control means 7 acts to isolate the brake valve of the brake cylinder. This can also be a device controlling braking by means of a delay mechanism. Instead of the average speed signal $V_R$, the speed signal transmitted by amplifier 13 can be represented by the highest, $V_m$, of actual representative speed magnitudes $V_1$, $V_2$, etc. arriving at said amplifier which, in this case, has the role of a comparator, with eventual yield by said amplifier of a coefficient different from one, at this speed $V_m$.

Furthermore, the differential signal produced by differential operational amplifier 14 could be transmitted directly to control means 7 in order to operate a gradual adjustment of the braking or propulsion system, as for example, by a variable electrical valve for the case of a compressed air braking system. In this case, threshold detector 18 and threshold reference signal $V_0$ are no longer necessary.

In brake system actuator means 6, the mechanism which changes the braking conditions of a circuit operating with a fluid under pressure can be a distributor relay, instead of an electrical valve.

The speed signal generator can be a tachymetric generator yielding a direct analog voltage signal.

In order to change the same set up from antiskidding to antislipping, it suffices to reverse the sign of the difference $V_R - V_i$ by passing the differential signal $V_D$ through a sign changer.

When the speed signal generator is a rotating device whose centrifugal force induces an axial displacement, or any other mobile device depending on the force mentioned, this displacement can be used to command a flap valve inserted in the pneumatic circuit and producing a pressure signal $V_i$ which is then compared to a reference pressure $V_R$ in order to create a differential pressure or a force which is transmitted to a pressure threshold detector or $V_0$ force detector, respectively, which, beyond the threshold mentioned, releases a command signal used by the braking or propulsion system.

The amplified command signal emitted by control means 7 (FIGS. 1 and 2) can activate two electrical valves for each wheel or group of wheels: one electrical valve is used for applying the brakes and the other for releasing the brakes.

The value of threshold reference signal $V_0$, which was shown to be dependent on the one wheel (FIG. 1) or on the average speed of all wheels (FIG. 2), can be used to advantage by using the actual average speed of the wheels of the vehicle. This adjustment of the value of this threshold actually allows the use of a sliding threshold value which induces reduction or resumption of braking and propulsion respectively, as soon as sliding exceeds a predetermined value.

This use of a relative sliding threshold between the wheel and the track seems to present a great advantage for wheels with pneumatic tires for which adherence increases up to a relative sliding level of about 20 percent and, decreases beyond this 20 percent threshold.

Having now described the invention, what I claim as new and desire to secure by Letters Patent, is:

1. Apparatus for preventing skidding or slipping of the wheels of a vehicle, said apparatus comprising:
   a. first means for monitoring and converting the actual rotation rate of each wheel or group of wheels into a representative speed signal of this rotation rate;
   b. second means connected to said first means for summing up the representative speed signals and producing an average speed signal therefrom;
   c. third means connected to said first means and said second means for comparing the representative speed signal produced for one wheel or group of wheels to said average speed signal, depending on the value yielded by said second means, for producing a differential speed signal;
   d. control means for controlling braking or propulsion of at least the wheel or the group of wheels subjected to comparison;
   e. speed threshold detection means connected to said second means for establishing a threshold reference signal as a function of the speed of at least one wheel or group of wheels and being operably interconnected between said third means and said control means for transmitting a first command signal to said control means upon occurrence of a difference between said differential speed signal and said threshold reference signal, for causing said control means to effect a reduction in braking when such difference occurs, f. differentiating means connected to said first means for producing an average acceleration or deceleration signal of the wheel or group of wheels;

g. acceleration threshold detector means connected to said differentiating means and, in turn, to said control means in parallel relation to said speed threshold detection means; and h. a bi-level signal generator also interconnected between said first means and said acceleration threshold detector means in parallel relation to said differentiating means for producing, either an acceleration or deceleration reference signal falling within a certain critical range of acceleration or deceleration limits at which wheel slipping or skidding occurs, and transmitting said acceleration or deceleration reference signal to said acceleration threshold detector means for producing a second command signal transmitted to said control means, as a function of such acceleration condition of the wheel or group of wheels, for effecting a reduction or increase, respectively, of propulsion of the wheel or wheels thus monitored responsively to said second command signal.

* * * * *